(12) United States Patent
Linnot et al.

(10) Patent No.: US 9,145,320 B2
(45) Date of Patent: Sep. 29, 2015

(54) CHROMIUM OXIDE POWDER

(75) Inventors: Cyril Linnot, Lyons (FR); Lionel Moitrier, Mallemort (FR); Yves Marcel Leon Boussant Roux, Montfavet (FR); Olivier Citti, Wellesley, MA (US); Richard Avedikian, Robion (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 286 days.

(21) Appl. No.: 13/811,552

(22) PCT Filed: Jul. 22, 2011

(86) PCT No.: PCT/IB2011/053287
§ 371 (c)(1),
(2), (4) Date: Mar. 14, 2013

(87) PCT Pub. No.: WO2012/020345
PCT Pub. Date: Feb. 16, 2012

(65) Prior Publication Data
US 2013/0174612 A1    Jul. 11, 2013

(30) Foreign Application Priority Data

Aug. 10, 2010   (FR) .................................. 10 56540
Aug. 10, 2010   (FR) .................................. 10 56541

(51) Int. Cl.
*C04B 35/12*        (2006.01)
*C03B 5/43*         (2006.01)
(Continued)

(52) U.S. Cl.
CPC ................ *C03B 5/43* (2013.01); *C04B 35/105* (2013.01); *C04B 35/106* (2013.01); *C04B 35/12* (2013.01); *C04B 35/6261* (2013.01); *C04B 35/6262* (2013.01); *C04B 35/62665* (2013.01); *C04B 2235/3201* (2013.01);
(Continued)

(58) Field of Classification Search
CPC .................................. C04B 35/12; C03B 5/43
See application file for complete search history.

(56) References Cited

U.S. PATENT DOCUMENTS 4,039,344 A    8/1977   Nishikawa et al.
4,158,569 A    6/1979   Brothers et al.
(Continued)

FOREIGN PATENT DOCUMENTS

FR          2 647 435        11/1990

OTHER PUBLICATIONS

Popov O.N., "Refractory Materials for Glass-Furnace Tanks," State Scientific Research Institute for Glass, pp. 15-17, Translated from Steklo I Keramika, No. 1, pp. 10-12, Jan. 1973, XP-002630976.
(Continued)

*Primary Examiner* — Karl Group
(74) *Attorney, Agent, or Firm* — Oliff PLC

(57) ABSTRACT

The invention relates to a particulate powder, said powder having a median circularity of greater than 0.87 wt % and less than 9.0 wt % of particles having a size greater than 100 μm. The powder and at least 80 wt % of the particles have a chemical composition in wt % on the basis of the oxides and for a total of 100%: $Cr_2O_3+Al_2O_3+ZrO_2+MgO+Fe_2O_3+SiO_2+TiO_2 \geq 90\%$; $Cr_2O_3+Al_2O_3+MgO \geq 60\%$; $Cr_2O_3 \geq 9\%$; $20\% \geq SiO_2 \geq 0.5\%$; and other oxides: $\leq 10\%$. The invention can be used for a glass furnace.

35 Claims, 2 Drawing Sheets

(51) Int. Cl.
  *C04B 35/105* (2006.01)
  *C04B 35/106* (2006.01)
  *C04B 35/626* (2006.01)

(52) U.S. Cl.
  CPC ............ *C04B 2235/3208* (2013.01); *C04B 2235/3217* (2013.01); *C04B 2235/3232* (2013.01); *C04B 2235/3241* (2013.01); *C04B 2235/3244* (2013.01); *C04B 2235/3418* (2013.01); *C04B 2235/5409* (2013.01); *C04B 2235/5427* (2013.01); *C04B 2235/5436* (2013.01); *C04B 2235/5445* (2013.01); *C04B 2235/72* (2013.01); *C04B 2235/77* (2013.01); *C04B 2235/96* (2013.01); *C04B 2235/963* (2013.01); *C04B 2235/9692* (2013.01); *Y10T 428/2982* (2015.01)

(56) References Cited

U.S. PATENT DOCUMENTS

| | | | | |
|---|---|---|---|---|
| 4,490,474 | A * | 12/1984 | Staten | 501/115 |
| 4,544,643 | A | 10/1985 | Fraser | |
| 4,823,359 | A | 4/1989 | Ault et al. | |
| 5,106,795 | A | 4/1992 | Drake et al. | |
| 6,352,951 | B1 | 3/2002 | Mossal et al. | |
| 7,754,633 | B2 | 7/2010 | Prior et al. | |
| 2013/0167592 | A1* | 7/2013 | Linnot et al. | 65/374.13 |

OTHER PUBLICATIONS

Guo et al., Zongqi, "Investigation and Application of $Cr_2O_3$-$Al_2O_3$-$ZrO_2$ Refractories for Slagging Coal Gasifiers," China's Refractories, vol. 6, No. 4, 1977, Luoyang Institute of Refractories Research, Luoyang, Henan 471039, China, pp. 18-22.

Guo et al., Zong-Qi, "Effect of Coal Slag on the Wear Rate and Microstructure of the $ZrO_2$-Bearing Chromia Refractories," Ceramics International 23 (1997) pp. 489-496.

Krauth, A. et al., "Some Experiences With Chromic-Oxide Refractory Materials," Glass, Feb. 1988, pp. 76-78.

Preliminary Search Report and Written Opinion issued Apr. 11, 2011 in French Patent Application No. 1056540 (with translation).

International Search Report and Written Opinion issued Nov. 24, 2011 in International Patent Application No. PCT/IB2011/053287 (with translation).

International Search Report and Written Opinion issued Nov. 24, 2011 in International Patent Application No. PCT/IB2011/053286 (with translation).

Preliminary Search Report and Written Opinion issued Apr. 1, 2011 in French Patent Application No. 1056541 (with translation).

U.S. Appl. No. 13/812,041, filed Jan. 28, 2013.

User manual of the SYSMEX FPIA 3000,Flow particle image analysis of size and shape.

Traite de ceramiques et materiaux, C. A. Jouenne, Editions Septima. Paris (1984), pp. 403 to 405.

Dec. 23, 2014 Office Action issued in U.S. Appl. No. 13/812,041.

* cited by examiner

CHROMIUM OXIDE POWDER

FIELD OF TECHNOLOGY

The invention relates to a powder comprising chromium oxide, to a particulate mixture produced from said powder, and to a sintered product manufactured from said particulate mixture. This refractory product can be used in particular in an environment in which it is in contact with molten glass.

BACKGROUND

Among refractory products, a distinction is made between fused-cast products and sintered products. In contrast to sintered products, fused-cast products most often comprise a very abundant intergranular vitreous phase, filling the network of crystalline grains. The problems encountered in their respective applications in the case of sintered products and in the case of fused-cast products, and the technical solutions adopted for solving them, are therefore generally different. Moreover, owing to the large differences between the manufacturing processes, a composition developed for making a fusion-cast product is not a priori usable as such for making a sintered product, and vice versa.

Sintered products are obtained by mixing suitable raw materials and then crude forming of this mixture and baking of the resultant crude article at a temperature and for a time sufficient to obtain sintering of said crude article. The sintered products are intended for very varied industries, depending on their chemical composition.

Refractory products comprising chromium oxide are used conventionally in applications where they are subject to extreme chemical aggression, for example in glass furnaces, in particular as furnace tank blocks, or in furnaces in which they are in contact with slag, or in garbage incinerators.

In these applications, mechanical and thermal stresses can also be severe. Thermal cycling (repeated increases and decreases in temperature) can in particular generate cracks, which will reduce the mechanical strength of the refractory products. These cracks can also be a preferred path for aggressive agents.

The use of said refractory products in contact with slag or with molten glass is known for example from U.S. Pat. No. 6,352,951 (incinerating furnaces containing blocks based on alumina and chrome) and from U.S. Pat. No. 4,823,359 (glass furnaces with linings consisting of alumina and chrome). The corrosion due to a slag is different from the corrosion caused by molten glass and therefore a product suitable for being brought in contact with slag is not necessarily suitable for an application in which it would come in contact with molten glass.

There is a constant need for new refractory products based on chromium oxide having good resistance to thermal shock and high corrosion resistance, notably in an application in which these products are brought in contact with molten glass.

One aim of the invention is to meet this need.

SUMMARY OF THE INVENTION

The invention proposes a powder of particles, said powder having a median circularity above 0.87 and at least 90 wt % of particles larger than 100 μm, the powder and at least 80 wt % of the particles having a chemical composition such that, in percentage by weight based on the oxides and for a total of 100%:

$Cr_2O_3+Al_2O_3+ZrO_2+MgO+Fe_2O_3+SiO_2+TiO_2 \geq 90\%$, and
$Cr_2O_3+Al_2O_3+MgO \geq 60\%$, and
$Cr_2O_3 \geq 9\%$, and
$20\% \geq SiO_2 \geq 0.5\%$, and
other oxides: $\leq 10\%$.

In the interests of clarity, "particle(s) according to the invention" means a particle of a powder according to the invention, which itself has said chemical composition. At least 80 wt % of the particles of a powder according to the invention are therefore "particles according to the invention".

The above composition is well known for the manufacture of refractory blocks. However, as will be seen in more detail later in the description, the inventors have discovered that by using particles according to the invention having a size larger than 100 μm and that are roughly spherical (having a median circularity above 0.87), it is possible to obtain good corrosion resistance and excellent resistance to thermal shock.

A powder according to the invention can further have one or more of the following optional characteristics:

Preferably, the composition of the powder is such that $Cr_2O_3+Al_2O_3+ZrO_2+MgO+Fe_2O_3+SiO_2+TiO_2 \geq 95\%$;

Preferably, the composition of the powder is such that the content of $ZrO_2$ is below 6%, below 5%, or even below 3%;

The composition of the powder is such that the content of $ZrO_2$ is above 1%, or above 2%;

Preferably, the composition of the powder is such that the total content $Cr_2O_3+Al_2O_3+MgO$ is above 65%, preferably above 70%, preferably above 80%, or even above 90%, or even above 92%, or even above 94%, in percentage by weight based on the oxides; in certain embodiments, the composition of the powder is such that $Cr_2O_3+Al_2O_3>80\%$, $Cr_2O_3+Al_2O_3>90\%$, or $Cr_2O_3+Al_2O_3>95\%$;

In one embodiment, $MgO<5\%$, $MgO<1\%$, $MgO<0.5\%$, or $MgO<0.1\%$, or the content of MgO is roughly zero;

In one embodiment, $Fe_2O_3<5\%$, $Fe_2O_3<1\%$, $Fe_2O_3<0.5\%$, or $Fe_2O_3<0.1\%$, or the content of $Fe_2O_3$ is roughly zero;

Preferably, the composition of the powder is such that the content of $SiO_2$ is above 1%, or even above 2%, and/or below 16%, preferably below 13%, preferably below 10%, preferably below 8%, preferably below 6%, preferably below 5%, or even below 4%, or even below 3%; advantageously, its densification is improved, but without its corrosion resistance being reduced;

Preferably, the composition of the powder is such that the content of $TiO_2$ is above 0.5%, and/or below 4%, preferably below 3%, or even below 2%;

Preferably, the composition of the powder is such that the total content $TiO_2+SiO_2$ is above 1.5%, preferably above 2%;

Preferably, the particles according to the invention contain a $Cr_2O_3$—$Al_2O_3$ solid solution and/or a spinel based on $Cr_2O_3$—MgO, for example $MgCr_2O_4$, and/or a spinel based on $Cr_2O_3$-iron oxide, for example $FeCr_2O_4$, and/or a spinel based on $Al_2O_3$—MgO, for example $MgAl_2O_4$, and/or a spinel based on $Al_2O_3$-iron oxide, for example $FeAl_2O_4$, and solid solutions thereof;

Preferably, the composition of the powder is such that the content of "other oxides" is below 5%, preferably below 4%, preferably below 3%, preferably below 2%, preferably below 1%;

Preferably, the composition of the powder is such that the sum of the contents of oxides represents more than 90%, more than 95%, or even roughly 100% of the weight of the powder according to the invention;

Preferably, the characteristics relating to the chemical composition of a powder according to the invention, and in particular the optional characteristics stated above, are applicable to more than 80%, more than 90%, or even more than 95% or more than 99 wt %, or roughly 100% of the particles of the powder;

The particles, in particular the particles according to the invention, are agglomerated particles, preferably sintered particles;

The particles according to the invention are not made by spraying;

Preferably, the powder according to the invention has an apparent density
- above 3.0 g/cm$^3$, preferably above 3.3 g/cm$^3$, or even above 3.5 g/cm$^3$, or even above 3.6 g/cm$^3$; and/or
- greater than 85%, preferably greater than 88%, preferably greater than 90%, preferably greater than 91%, preferably greater than 92%, or even greater than 93%, or even greater than 94%, or even greater than 95%, or even greater than 96% of the theoretical density; advantageously, it has improved flowability;

Preferably, the powder according to the invention has an open pore volume below 10%, preferably below 6%, preferably below 5%, preferably below 3%, preferably below 2%, preferably below 1%, or even below 0.7%, or even below 0.6%; a sintered product obtained from a powder according to the invention has improved corrosion resistance, notably when in contact with molten glass;

Preferably, more than 85%, preferably more than 90%, preferably more than 95%, preferably more than 99%, by weight, of the particles, in particular of the particles according to the invention, preferably roughly all the particles according to the invention are larger than 200 μm, preferably larger than 300 μm, preferably larger than 400 μm, or even larger than 0.5 mm and/or smaller than 10 mm, preferably smaller than 5 mm;

Preferably, the median circularity $Ci_{50}$ is above 0.88, preferably above 0.90, preferably above 0.91, preferably above 0.92, preferably above 0.93; advantageously, this results in improved resistance to thermal shock;

Preferably, more than 80%, more than 90%, or even more than 95% or more than 99 wt %, or roughly 100% of the particles of the powder are granules;

Preferably, the circularity $Ci_{10}$ is above 0.72, preferably above 0.74, preferably above 0.76, preferably above 0.78, preferably above 0.80, preferably above 0.82;

Preferably, the median convexity of the powder according to the invention is above 0.90, preferably above 0.92, preferably above 0.94, preferably above 0.95, preferably above 0.96;

Preferably, the convexity $Co_{10}$ is above 0.80, preferably above 0.82, preferably above 0.85, preferably above 0.88, preferably above 0.90;

Preferably, the powder according to the invention has an open pore volume below 2%, preferably below 1%, and a median circularity above 0.90, preferably above 0.92.

In a first particular embodiment, the composition of the powder according to the invention is such that, in percentage by weight based on the oxides:
$Cr_2O_3$: 9% to 50%;
$Al_2O_3$: 45% to 88%;
$SiO_2<20\%$, preferably $SiO_2<16\%$, preferably $SiO_2<13\%$, preferably $SiO_2<10\%$, preferably $SiO_2<8\%$, preferably $SiO_2<6\%$, preferably $SiO_2<5\%$, preferably $SiO_2<4\%$, preferably $SiO_2<3\%$;
$Fe_2O_3<1\%$;
$MgO<0.5\%$;
$0.5\%<TiO_2<4\%$, or even $TiO_2<2\%$;
$ZrO_2<5\%$;
other oxides<2%, preferably: other oxides<1%.

The content of $Cr_2O_3$ can be between 10% and 20%, and/or between 20% and 30%, and/or between 30% and 40%, and/or between 40% and 50%, and/or the content of $Al_2O_3$ can be between 45% and 55%, and/or between 55% and 65%, and/or between 65% and 75%, and/or between 75% and 88%.

In a second particular embodiment, the composition of the powder according to the invention is such that, in percentage by weight based on the oxides:
$Cr_2O_3$: 50% to 95%;
$Al_2O_3$: 2% to 45%;
$SiO_2<20\%$, preferably $SiO_2<16\%$, preferably $SiO_2<13\%$, preferably $SiO_2<10\%$, preferably $SiO_2<8\%$, preferably $SiO_2<6\%$, preferably $SiO_2<5\%$, preferably $SiO_2<4\%$, preferably $SiO_2<3\%$;
$Fe_2O_3<1\%$;
$MgO<0.5\%$;
$0.5\%<TiO_2<4\%$, or even $TiO_2<2\%$;
$ZrO_2<5\%$;
other oxides<2%, preferably: other oxides<1%.

The content of $Cr_2O_3$ can be between 50% and 60%, and/or between 60% and 70%, and/or between 70% and 80%, and/or between 80% and 95%, and/or the content of $Al_2O_3$ can be between 2% and 12%, and/or between 12% and 22%, and/or between 22% and 32%, and/or between 32% and 45%.

In a third particular embodiment, the composition of the powder according to the invention is such that, in percentage by weight based on the oxides:
$Cr_2O_3$: 95% to 99%;
$Al_2O_3$: 0 to 4%;
$SiO_2<4\%$, preferably $SiO_2<3\%$, preferably <2%, preferably <1%;
$Fe_2O_3<4\%$;
$MgO<0.5\%$;
$0.5\%<TiO_2<5\%$, or even $TiO_2<4\%$, or even $TiO_2<2\%$;
$ZrO_2<4\%$;
other oxides<2%, preferably: other oxides<1%.

In a fourth particular embodiment, the composition of the powder according to the invention is such that, in percentage by weight based on the oxides:
$Cr_2O_3$: 15% to 50%;
$Al_2O_3$: 10% to 80%;
$1\%<Fe_2O_3<30\%$, or even $3\%<Fe_2O_3$;
$0.5\%<MgO<20\%$, preferably $MgO<10\%$;
$SiO_2<20\%$, preferably $SiO_2<16\%$, preferably $SiO_2<13\%$, preferably $SiO_2<10\%$, preferably $SiO_2<8\%$, preferably $SiO_2<6\%$, preferably $SiO_2<5\%$, preferably $SiO_2<4\%$, preferably $SiO_2<3\%$;
$0.5\%<TiO_2<4\%$, or even $TiO_2<2\%$;
$ZrO_2<5\%$;
other oxides<2%, preferably other oxides<1%.

The content of $Cr_2O_3$ can be between 15% and 25%, and/or between 25% and 35%, and/or between 35% and 50%, and/or the content of $Al_2O_3$ can be between 10% and 20%, and/or between 20% and 30%, and/or between 30% and 40%, and/or between 40% and 50%, and/or between 50% and 60%, and/or between 60% and 70%, and/or between 70% and 80%, and/or the content of $Fe_2O_3$ can be between 3% and 10%, and/or between 10% and 20%, and/or between 20% and 30%.

As far as possible, the particular embodiments can be combined with any one of the preferred characteristics described above.

In particular, preferably, in combination with the particular embodiments described above, the powder according to the invention has an open pore volume below 2%, preferably below 1%, the median circularity being above 0.90, preferably above 0.92.

Moreover, preferably, the characteristics relating to the chemical composition of the particular embodiments and variants thereof described above are applicable to more than 80%, more than 90%, or even more than 95% or more than 99 wt %, or roughly 100% of the particles of the powder according to the invention.

A powder according to the invention can notably be used for making a particulate mixture according to the invention having more than 10% of particles with a size less than or equal to 50 μm, so-called "matrix particles", the particulate mixture further comprising more than 15% of a powder according to the invention, in percentage by weight based on the particulate mixture.

A particulate mixture according to the invention can also have one or more of the following optional characteristics:
- Preferably, said powder represents more than 20%, preferably more than 25%, or even more than 30%, or even more than 40% of the particulate mixture according to the invention, in percentage by weight based on the particulate mixture;
- Preferably, said powder constitutes at least 80%, or even at least 85%, or even at least 90%, or even at least 95%, or even roughly 100%, by weight of the particles larger than 100 μm;
- Preferably, the particles of the particulate mixture are smaller than 10 mm, preferably smaller than 5 mm;
- Preferably, the particulate mixture contains at least 10% of particles larger than 2 mm, in percentage by weight based on the particulate mixture;
- Preferably, more than 80%, preferably more than 90%, preferably more than 95%, preferably more than 99%, by weight of the particles larger than 50 μm, so-called "grains", have an apparent density above 85%, preferably above 88%, preferably above 90%, preferably above 91%, preferably above 92%, or even above 93% of the theoretical density;
- Preferably, the powder according to the invention has an open pore volume below 10%, preferably below 6%, preferably below 5%, preferably below 3%, preferably below 2%, preferably below 1%, or even below 0.7%, or even below 0.6%;
- The grains containing chromium oxide are preferably sintered particles;
- In a particular embodiment, at least 80%, preferably at least 90%, preferably at least 95%, preferably at least 99%, or even roughly 100% by weight of the grains are particles according to the invention.

Preferably, in a first particular embodiment, the particulate mixture according to the invention has the following composition, in percentage by weight based on the oxides:
  $Cr_2O_3+Al_2O_3>80\%$, preferably $Cr_2O_3+Al_2O_3>90\%$, preferably $Cr_2O_3+Al_2O_3>95\%$,
  $10\%<Cr_2O_3<50\%$, preferably $Cr_2O_3<47\%$;
  $SiO_2<20\%$, preferably $SiO_2<16\%$, preferably $SiO_2<13\%$, preferably $SiO_2<10\%$, preferably $SiO_2<8\%$, preferably $SiO_2<6\%$, preferably $SiO_2<5\%$, preferably $SiO_2<4\%$, preferably $SiO_2<3\%$;
  $Fe_2O_3<1\%$;
  $MgO<0.5\%$;
  $0.5\%<TiO_2<4\%$, or even $TiO_2<2\%$;
  $ZrO_2<5\%$;
  other oxides<2%, preferably: other oxides<1%.

The content of $Cr_2O_3$ can be between 10% and 20%, between 20% and 30%, between 30% and 40%, or between 40% and 50%, and/or the content of $Al_2O_3$ can be between 45% and 55%, between 55% and 65%, between 65% and 75%, or between 75% and 88%.

Preferably, in particular in this first particular embodiment, the particulate mixture contains a powder according to the first particular embodiment of said powder.

Preferably, in a second particular embodiment, the particulate mixture according to the invention has the following composition, in percentage by weight based on the oxides:
  $Cr_2O_3+Al_2O_3>80\%$, preferably $Cr_2O_3+Al_2O_3>90\%$, preferably $Cr_2O_3+Al_2O_3>95\%$,
  $50\%<Cr_2O_3<83\%$;
  $SiO_2<20\%$, preferably $SiO_2<16\%$, preferably $SiO_2<13\%$, preferably $SiO_2<10\%$, preferably $SiO_2<8\%$, preferably $SiO_2<6\%$, preferably $SiO_2<5\%$, preferably $SiO_2<4\%$, preferably $SiO_2<3\%$;
  $Fe_2O_3<1\%$;
  $MgO<0.5\%$;
  $0.5\%<TiO_2<4\%$, or even $TiO_2<2\%$;
  $ZrO_2<5\%$;
  other oxides<2%, preferably: other oxides<1%.

The content of $Cr_2O_3$ can be between 50% and 60%, between 60% and 70%, between 70% and 80%, or between 80% and 95%, and/or the content of $Al_2O_3$ can be between 2% and 12%, between 12% and 22%, between 22% and 32%, or between 32% and 45%.

Preferably, in particular in this second particular embodiment, the particulate mixture contains a powder according to the second particular embodiment of said powder.

Preferably, in a third particular embodiment, the particulate mixture according to the invention has the following composition, in percentage by weight based on the oxides:
  $Cr_2O_3+Al_2O_3>90\%$,
  $80\%<Cr_2O_3$, preferably $83\%<Cr_2O_3$;
  $SiO_2<4\%$, preferably $SiO_2<3\%$, preferably $SiO_2<2\%$, preferably $SiO_2<1\%$;
  $Fe_2O_3<1\%$;
  $MgO<0.5\%$;
  $0.5\%<TiO_2<4\%$, or even $TiO_2<2\%$;
  $ZrO_2<5\%$;
  other oxides<2%, preferably: other oxides<1%.

Preferably, in particular in this third particular embodiment, the particulate mixture contains a powder according to the invention and according to the third particular embodiment of said powder.

Preferably, in a fourth particular embodiment, the particulate mixture according to the invention has the following composition, in percentage by weight based on the oxides:
  $Cr_2O_3+Al_2O_3>55\%$,
  $Cr_2O_3<50\%$;
  $SiO_2<20\%$, preferably $SiO_2<16\%$, preferably $SiO_2<13\%$, preferably $SiO_2<10\%$, preferably $SiO_2<8\%$, preferably $SiO_2<6\%$, preferably $SiO_2<5\%$, preferably $SiO_2<4\%$, preferably $SiO_2<3\%$;
  $1\%<Fe_2O_3<30\%$;
  $MgO<20\%$, preferably <10%;
  $0.5\%<TiO_2<4\%$, or even $TiO_2<2\%$;
  $ZrO_2<5\%$;
  other oxides<2%, preferably: other oxides<1%.

The content of $Cr_2O_3$ can be between 15% and 25%, between 25% and 35%, or between 35% and 50%, and/or the content of $Al_2O_3$ can be between 10% and 20%, between 20% and 30%, between 30% and 40%, between 40% and 50%, between 50% and 60%, between 60% and 70%, or between 70% and 80%, and/or the content of $Fe_2O_3$ can be between 3% and 10%, between 10% and 20%, or between 20% and 30%.

Preferably, in particular in this fourth particular embodiment, the particulate mixture contains a powder according to the fourth particular embodiment of said powder.

In particular when it is intended to be used as raw material for making a sintered article, a particulate mixture according to the invention can comprise, as complement to 100% of the aforementioned oxides, more than 0.1% and/or less than 6 wt % of a forming additive.

Preferably, the particles according to the invention have not been ground before mixing with the forming additive.

The invention also relates to a method of making a particulate mixture according to the invention by mixing a powder according to the invention with other particulate raw materials.

The invention also relates to a method of making a sintered refractory product, having the following successive steps:
A) preparing an initial charge by mixing a particulate mixture according to the invention and water;
B) forming said initial charge so as to form a preform;
C) sintering said preform.

The invention also relates to a sintered product obtained by sintering a particulate mixture according to the invention, in particular according to steps A) to C) below.

Preferably, this product has a density above 3.1 g/m³, or even above 3.3 g/m³ and/or below 4.5 g/cm³, or even below 4.3 g/cm³.

The invention finally relates to a device selected from a reactor, in particular a gasifier reactor, a glass furnace, a regenerator, and a distributing channel for molten glass comprising a block and/or a lining of a sintered product according to the invention.

DEFINITIONS

The "matrix fraction" consists of particles of size less than or equal to 50 μm, so-called "matrix particles". These particles are intended to make up the matrix of the refractory product. The complementary fraction, consisting of particles larger than 50 μm or "grains" is called "granulate".

The "size of a particle" means the dimension of a particle given conventionally by a characterization of granulometric distribution performed with a laser granulometer. The laser granulometer used for the examples is a Partica LA-950 from the company HORIBA.

The "circularity" of a particle observed is the ratio $P_D/P_r$, with $P_r$ denoting the perimeter of the particle as observed, and $P_D$ denoting the perimeter of the disk having the same area as that of the particle as observed. The circularity depends on the direction of observation.

As shown in FIG. 1b, the circularity "Ci" of a particle P is evaluated by determining the perimeter $P_D$ of the disk D having an area equal to the area $A_p$ of the particle P on a photograph of said particle. The perimeter $P_r$ of said particle is also determined. The circularity is equal to the ratio $$\text{Thus } Ci = \frac{2*\sqrt{\pi A_p}}{Pr}.$$

The more elongated the particle, the lower the circularity. The user manual of the SYSMEX FPIA 3000 also describes this procedure (see "detailed specification sheets" on www.malvern.co.uk).

The percentiles or "centiles" 10 ($Ci_{10}$) and 50 ($Ci_{50}$) of a set of particles are the circularities of the particles corresponding to the percentages, by number, of 10% and 50% respectively, on the cumulative distribution curve of the circularities of the particles of said set, the particle circularities being classified in increasing order. For example, 10 wt % of the particles of this set have a circularity below $Ci_{10}$. The percentiles can be evaluated using an instrument of the type Morphologi® G3 marketed by the company Malvern. $Ci_{50}$ is also called "median circularity".

By extension, these percentiles are used for characterizing the distribution of the circularities of the particles of a sintered material obtained from this powder.

For determining the percentiles $Ci_{10}$ and $Ci_{50}$ the set of particles is poured onto a flat plate and observed perpendicularly to said plate. The number of particles recorded is greater than 250, which makes it possible to obtain roughly identical percentiles, regardless of the manner in which the particles were poured onto the plate. A method of determination is described in more detail in the examples given below.

The "convexity" of a particle observed is the ratio $P_c/P_r$, with $P_c$ denoting the convex perimeter of the particle as observed and $P_r$ denoting the perimeter of said particle as observed, as shown in FIG. 1a. The convexity of a particle depends on the direction of observation.

The percentiles or "centiles" 10 ($Co_{10}$) and 50 ($Co_{50}$) of a set of particles are the convexities of particles corresponding to the percentages, by number, of 10% and 50%, respectively, on the cumulative distribution curve of the convexities of the particles of said set, the particle convexities being classified in increasing order. For example, 10 wt % of the particles of this set have a convexity below $Co_{10}$. The percentiles can be evaluated using an instrument of the type Morphologi® G3 marketed by the company Malvern. $Co_{50}$ is also called "median convexity".

By extension, these percentiles are used for characterizing the distribution of the convexities of the particles of a sintered material obtained from this powder.

To determine the percentiles $Co_{10}$ and $Co_{50}$ the set of particles is poured onto a flat plate and observed perpendicularly to said plate. The number of particles is greater than 250, which makes it possible to obtain roughly identical percentiles, regardless of the manner in which the particles were poured onto the plate. A method of determination is described in more detail in the examples given below.

A "granule" is a particle having a circularity above 0.87.

"Agglomerated particle" or "agglomerate" means a particle formed by a set of other particles. Agglomerated particles can notably be obtained by sintering or by means of a binder.

Unless stated otherwise, all the percentages are percentages by weight.

The chemical analyses or the chemical compositions "of the particles according to the invention" refer to the composition of each of said particles. The chemical analyses or chemical compositions of a "particulate mixture" or of a "powder" refer to the average composition, of the set of particles in question.

In the formulas linking different contents of oxides, the sign "+" conventionally denotes "and/or". Thus, in a powder according to the invention, $Al_2O_3$, $ZrO_2$, $MgO$, $Fe_2O_3$, and $TiO_2$ in particular are optional.

BRIEF DESCRIPTION OF THE DRAWINGS

Other features and advantages of the invention will also appear on reading the detailed description and on examining the drawing in which.

DETAILED DESCRIPTION

Figure 1A:
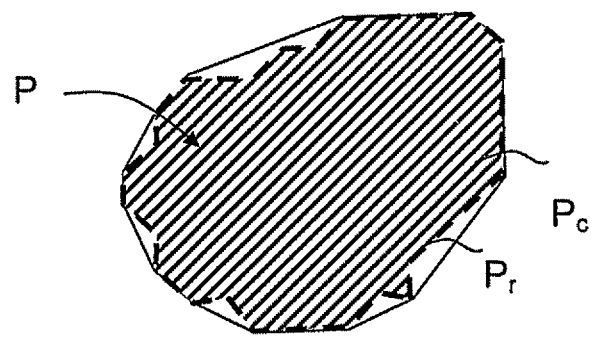
FIGS. 1a and 1b illustrate the method employed for measuring convexity and circularity, respectively.
Figure 1B:
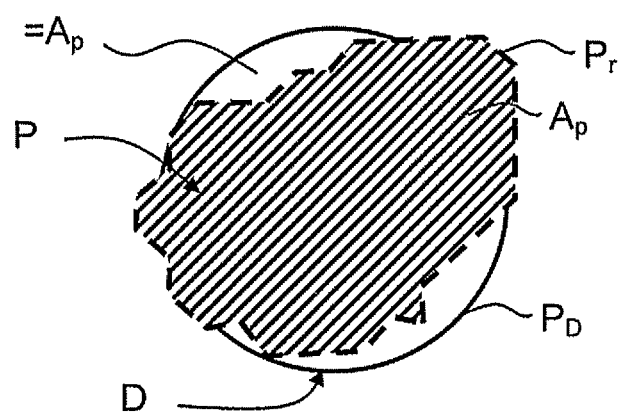

Manufacture of a Powder According to the Invention

Particles according to the invention can be manufactured by a conventional method comprising the following successive steps:
a) preparing an initial charge by mixing raw materials and water;
b) forming said initial charge so as to form a powder according to the invention;
c) optionally, sintering of the particles of the powder obtained in step b).

An example of the method is described in detail in the examples.

In step a), the mixture of raw materials is adapted so as to obtain a powder and particles having the desired chemical composition. Any mixing means can be used, for example a mixer or an intensive mixer.

The content of "other oxides" is limited to 10%. With a content of "other oxides" below 10%, the inventors consider that the advantageous effects of the present invention are not substantially affected.

The "other oxides" can in particular be the refractory oxides that are usually present in refractory products comprising chromium oxide, for example CaO, $K_2O$ and $Na_2O$.

In step b), preferably, the forming does not comprise a spraying operation, in particular a step of spraying of a slurry or "spray drying". Such a process in fact leads to a low density and/or a powder with small particles.

Step b) can comprise a granulation operation. Such an operation cannot, however, guarantee obtaining a median circularity above 0.87 and a density greater than 85% of the theoretical density. To obtain such a result, an intensive mixer is preferably used, preferably with an outer tip linear speed greater than 6 m/s, and with sequential feed of said mixer with initial charge.

In step c), the particles are sintered, for example in a firing kiln. All firing kilns can be used, for example intermittent kilns, but also rotary kilns. The sintering parameters are determined as a function of the composition of the particles.

The sintering temperature can be between 1400° C. and 1700° C. Sintering can be carried out in air, but also in neutral conditions (under nitrogen for example), or even in reducing conditions (for example under excess of carbon monoxide). Preferably, sintering is carried out in air.

The holding time at temperature can be between 1 hour and 10 hours, preferably between 2 hours and 5 hours.

The open pore volume of the powder according to the invention can be adjusted by varying the granulometric distribution of the particulate raw materials, or by acting on the plateau temperature and/or time during sintering.

The inventors investigated the effect of the open pore volume of the powder according to the invention on the properties of the sintered refractory product obtained from this powder. They discovered that replacing chamotte grains (used conventionally, which are not granules) with a powder according to the invention having an open pore volume greater than 6% leads to a degradation of the resistance to corrosion by molten glass of this sintered refractory product. Conversely, surprisingly, when the open pore volume of the powder according to the invention used is below 2%, the corrosion resistance is greater than that of the conventional products with chamotte grains.

The inventors also investigated the effect of the open pore volume of the powder according to the invention used on an initial charge composed of this powder and water. They discovered that replacing chamotte grains with a powder according to the invention having an open pore volume greater than 10% leads to a degradation of the flowability of the initial charge during forming. Conversely, surprisingly, when the open pore volume of the powder according to the invention used is below 6% the flowability is greater than that of the conventional products with chamotte grains.

The flowability is further improved when the open pore volume of the powder according to the invention is below 2%.

Preferably, the powder according to the invention has an open pore volume below 6%, preferably below 2%.

Particulate Mixtures

A powder according to the invention can be incorporated in a particulate mixture according to the invention.

A particulate mixture according to the invention preferably comprises more than 15%, more than 20%, or even more than 25% and/or less than 45%, less than 40%, or even less than 35%, or even less than 30% of matrix particles, in percentage by weight.

Preferably, the matrix fraction and preferably at least 80 wt % of the matrix particles have a chemical composition such that, in percentages by weight based on the oxides and for a total of 100%:

$Cr_2O_3+Al_2O_3+ZrO_2+MgO+Fe_2O_3+SiO_2+TiO_2+CaO \geq 90\%$, preferably $Cr_2O_3+Al_2O_3+ZrO_2+MgO+Fe_2O_3+SiO_2+TiO_2+CaO \geq 95\%$, and $Cr_2O_3+Al_2O_3+MgO \geq 50\%$, and $Cr_2O_3 \geq 7\%$, and $15\% \geq SiO_2 \geq 0.1\%$, and other oxides $\leq 10\%$, preferably: other oxides $\leq 5\%$.

Preferably, at least 90 wt % of the matrix particles are smaller than 40 μm, preferably smaller than 30 μm, preferably smaller than 20 μm, or even smaller than 10 μm.

Preferably, the composition of the matrix fraction is such that the total content $Cr_2O_3+Al_2O_3+MgO$ is greater than 65%, preferably greater than 70%, preferably greater than 80%, or even greater than 90%, in percentage by weight based on the oxides; and/or
the content of $SiO_2$ is below 12%, preferably below 10%, preferably below 8%, preferably below 6%, preferably below 5%, or even below 4%, or even below 3%; and/or
the content of $TiO_2$ is below 7%, or even below 4%, or even below 3%, or even below 2%; and/or
the content of "other oxides" is below 5%, preferably below 4%, preferably below 3%, preferably below 2%, preferably below 1%.

In certain embodiments, the composition of the matrix fraction is such that $Cr_2O_3+Al_2O_3>80\%$, $Cr_2O_3+Al_2O_3>90\%$, or even $Cr_2O_3+Al_2O_3>95\%$.

In certain embodiments, the composition of the matrix fraction is such that the content of $TiO_2$ is below 0.2%.

In certain embodiments, the composition of the matrix fraction is such that the content of $Al_2O_3$ is above 5%, above 7.5%, above 10%, above 15% and/or is below 72%, below 65%, below 60%, below 50%.

Preferably, the matrix particles contain a $Cr_2O_3$—$Al_2O_3$ solid solution and/or a spinel based on $Cr_2O_3$—MgO, for example $MgCr_2O_4$, and/or a spinel based on $Cr_2O_3$-iron oxide, for example $FeCr_2O_4$, and/or a spinel based on $Al_2O_3$—MgO, for example $MgAl_2O_4$, and/or a spinel based on $Al_2O_3$-iron oxide, for example $FeAl_2O_4$, and solid solutions thereof.

Also preferably, the sum of the contents of oxides in the particles of the matrix fraction represents more than 90%, more than 95%, or even roughly 100% of the weight of said matrix particles.

This matrix fraction preferably consists of particles of chromium oxide on the one hand, and, on the other hand, particles of alumina and/or of zirconia and/or of magnesia and/or of zircon and/or of iron oxide and/or of titanium oxide and/or of silica and/or of lime. Preferably, the matrix fraction consists of particles composed on the one hand of chromium oxide, and on the other hand of alumina and/or of magnesia and/or of iron oxide and/or of titanium oxide and/or of silica and/or of lime, or consists of mixtures of such particles. For example, the matrix fraction can be a mixture of particles of chromium oxide and particles of alumina, but can also consist of particles of chromium oxide and alumina, for example in the form of a solid solution. Preferably, said matrix particles are particles of solid solution of the aforementioned oxides. Preferably, the matrix particles are composed of chromium oxide on the one hand and, on the other hand, alumina and/or lime and/or zirconia and/or titanium oxide.

The amount of matrix particles of zirconia is preferably below 10%, preferably below 8%, preferably below 5%, in percentage by weight based on the oxides.

In one embodiment, the particulate mixture does not contain matrix particles of zirconia.

The median size of the matrix particles can be less than 25 microns, less than 15 microns, less than 10 microns, or even less than 7 microns.

A particulate mixture according to the invention preferably comprises less than 80%, or even less than 75% of grains, in percentage by weight based on the particulate mixture.

The granulate can consist of particles of chromium oxide on the one hand, and, on the other hand, particles of alumina and/or of zirconia and/or of magnesia and/or of zircon and/or of iron oxide and/or of titanium oxide and/or of silica. Preferably, the granulate consists of particles composed of chromium oxide on the one hand, and, on the other hand, alumina and/or zirconia and/or magnesia and/or zircon and/or iron oxide and/or titanium oxide and/or silica, or mixtures of such particles. For example, the granulate can be a mixture of particles of chromium oxide and particles of alumina, but can also be a mixture of particles of chromium oxide and of alumina for example in the form of a solid solution. Preferably, the grains are composed of chromium oxide on the one hand, and, on the other hand, alumina and/or zirconia and/or titanium oxide.

Also preferably, the particulate mixture does not contain particles of zirconia in the granulate, preferably does not contain grains of zirconia, in particular particles of zirconia with size between 50 μm and 500 μm. Advantageously, its resistance to stoning in contact with molten glass is improved.

The inventors discovered, moreover, that to increase the life of the refractory products according to the invention when they are in contact with molten glass, it is advantageous for the particulate mixture according to the invention to have a content of chromium oxide, denoted "$Cr_T$", between 10% and 82%, preferably between 10% and 80%, in percentage by weight based on the oxides of the refractory mixture, the matrix fraction being such that $$0.39 \cdot (Cr_T) + 24 < Cr_M < 0.39 \cdot (Cr_T) + 52 \quad (I),$$

$Cr_M$ denoting the content by weight of chromium oxide in the matrix fraction, in percentage by weight based on the oxides of the matrix fraction, and
the granulate being such that $x_{II} \geq 97\%$, $x_{III} \geq 70\%$, and $x_{IV} \leq x_{III} - 70\%$, $Cr_G$ denoting the content by weight of chromium oxide of a grain, in percentage by weight based on the oxides of said grain, $x_{II}$ denoting the amount, in percentage by weight based on the granulate, of grains fulfilling the following condition (II):

if $10\% \leq Cr_T \leq 30\%$, then $Cr_G \leq 0.018 \cdot (Cr_T)^2 - 0.390 \cdot (Cr_T) + 58.8$;

if $30\% < Cr_T \leq 60\%$, then $Cr_G \leq 1.22 \cdot (Cr_T) + 26.7$;

if $60\% < Cr_T \leq 82\%$, in particular if $Cr_T \leq 80\%$, then $Cr_G \leq 100$, (II)

$x_{III}$ denoting the amount, in percentage by weight based on the granulate, of grains fulfilling the following condition (III):

if $10\% \leq Cr_T \leq 30\%$, then $0.018 \cdot (Cr_T)^2 - 0.390 \cdot (Cr_T) + 9.10 \leq Cr_G \leq 0.018 \cdot (Cr_T)^2 - 0.390 \cdot (Cr_T) + 25.10$;

if $30\% < Cr_T \leq 60\%$, then $1.17 \cdot (Cr_T) - 21.5 \leq Cr_G \leq 1.17 \cdot (Cr_T) - 5.5$;

if $60\% < Cr_T \leq 82\%$, in particular if $Cr_T \leq 80\%$, then $1.17 \cdot (Cr_T) - 21.5 \leq 1.67 \cdot (Cr_T) - 35.5$ ($Cr_G$ remaining of course less than or equal to 100%) (III)

$x_{iv}$ denoting the amount, in percentage by weight based on the granulate, of grains fulfilling the following condition (IV):

If $10\% \leq Cr_T \leq 30\%$, then $0.018 \cdot (Cr_T)^2 - 0.390 \cdot (Cr_T) + 9.10 > Cr_G$;

If $30\% < Cr_T \leq 60\%$, then $1.17 \cdot (Cr_T) - 21.5 > Cr_G$;

If $60\% < Cr_T \leq 82\%$, in particular if $Cr_T \leq 80\%$, then $1.17 \cdot (Cr_T) - 21.5 > Cr_G$. (IV)

The inventors in fact found that this composition leads advantageously to a particularly uniform corrosion profile, and therefore prolongs the life of the refractory products.

Preferably $0.39 \cdot (Cr_T) + 29 < Cr_M < 0.39 \cdot (Cr_T) + 47$ (V);

more preferably $0.39 \cdot (Cr_T) + 32 < Cr_M < 0.39 \cdot (Cr_T) + 44.5$ (VI).

Preferably, $x_{II}$ is greater than 98%, preferably greater than 99%, preferably roughly equal to 100%.

Preferably, $x_{III}$ is greater than 85% and $x_{IV}$ is below 1%, preferably roughly equal to 0%.

Preferably, at least 70 wt % of the grains have, in percentage by weight based on the oxides, a content of chromium oxide fulfilling the following condition (VII):

If $10\% \leq Cr_T \leq 30\%$, then $0.018 \cdot (Cr_T)^2 - 0.390 \cdot (Cr_T) + 13.10 \leq Cr_G \leq 0.018 \cdot (Cr_T)^2 - 0.390 \cdot (Cr_T) + 21.10$;

If $30\% < Cr_T \leq 60\%$, then $1.17 \cdot (Cr_T) - 17.5 \leq Cr_G \leq 1.17 \cdot (Cr_T) - 9.5$;

If $60\% < Cr_T \leq 82\%$, in particular if $Cr_T \leq 80\%$, then $1.67 \cdot (Cr_T) - 51.5 \leq Cr_G \leq 1.67 \cdot (Cr_T) - 39.5$.

Preferably, at least 70 wt % of the grains have, in percentage by weight based on the oxides, a content of chromium oxide fulfilling the following condition (VIII):

If $10\% \leq Cr_T \leq 30\%$, then $0.018 \cdot (Cr_T)^2 - 0.390 \cdot (Cr_T) + 13.10 \leq Cr_G \leq 0.018 \cdot (Cr_T)^2 - 0.390 \cdot (Cr_T) + 21.10$;

If $30\%<Cr_T\leq60\%$, then $1.17\cdot(Cr_T)-17.5\leq Cr_G\leq1.17\cdot(Cr_T)-9.5$;

If $60\%<Cr_T\leq82\%$, in particular if $Cr_T\leq80\%$, then $1.67\cdot(Cr_T)-47.5\leq Cr_G\leq1.67\cdot(Cr_T)-39.5$.

In a particular embodiment, the matrix fraction has a content of chromium oxide "$Cr_M$" fulfilling condition (VI) and at least 70 wt % of the grains have a content of chromium oxide "$Cr_G$" fulfilling condition (VIII).

In a second particular embodiment, the matrix fraction has a content of chromium oxide "$Cr_M$" fulfilling condition (VI) and at least 99 wt % of the grains have a content of chromium oxide "$Cr_G$" fulfilling condition (VIII).

Preferably, at least 90%, preferably at least 95%, preferably at least 99%, preferably roughly 100 wt % of the grains have a content of chromium oxide "$Cr_G$" fulfilling condition (III) and/or condition (VII).

In one embodiment, one or more of conditions (I) to (VI) apply to more than 80%, more than 90%, or even more than 95% or roughly 100% of the particles according to the invention, in percentage by weight.

The standard deviation of the distribution of the content of chromium oxide in the grains is preferably below 1.5, preferably below 1, more preferably below 0.75. The difference between the lowest and the highest content of chromium oxide is preferably below 9%, preferably below 6%, preferably below 4.5%. The grains then all have similar contents of chromium oxide.

The standard deviation of the distribution of the content of each of the different constituents of the grains is preferably below 1.5, preferably below 1, more preferably below 0.75. The grains then all have similar compositions.

Particles according to the invention can be prepared from a mixture of raw materials already comprising a forming additive. The additive can in particular be selected from the group comprising:
  clays;
  plasticizers, such as polyethylene glycol (or "PEG") or polyvinyl alcohol (or "PVA");
  cements, preferably with high alumina content;
  hydratable aluminas, such as boehmite;
  binders, including organic temporary binders such as resins, lignosulfonates, carboxymethylcellulose or dextrin;
  deflocculating agents, such as polyphosphates of alkali metals, polyacrylates of alkali metals, polycarboxylates; and
  mixtures of these products.

Preferably, the forming additive is selected from the group comprising cements, deflocculating agents, clays, lignosulfonates, PVA and mixtures thereof.

Method of Making a Refractory Product According to the Invention

A powder according to the invention can be used advantageously for making products having granules bound by a binding matrix, in particular completely or partially replacing chamotte grains.

For this purpose, a method comprising steps A) to C) described above can be employed. This method advantageously makes it possible to manufacture a sintered refractory product having an apparent density between 3.1 and 4.5 g/cm³, preferably between 3.3 and 4.3 g/cm³. The Andréasen or Fuller-Bolomey models of compaction can be used for modifying the apparent density of the sintered refractory products. These models of compaction are notably described in the work with the title "Traité de céramiques et matériaux minéraux" C. A. Jouenne, Editions Septima. Paris (1984), pages 403 to 405.

In step A), a powder according to the invention is mixed with other raw materials and/or with a forming additive to form the initial charge.

Preferably, the particles of this powder are sintered, i.e. consolidated thermally. They can thus advantageously retain their spherical shape during handling. For the same reason, these particles need not all be ground before being introduced into the initial charge.

A particulate mixture can also be supplied ready-to-use. Then all that is required is to mix it with water to prepare the initial charge.

The amount of water depends on the method used in step B).

In the case of forming by cold pressing, addition of an amount of water between 1.5% and 4%, in percentage by weight based on the particulate mixture without the additives, is preferred. In the case of forming involving a hydraulic bond, for example casting, addition of an amount of water between 3 and 7%, in percentage by weight based on the particulate mixture without the additives, is preferred.

Without being able to explain it theoretically, the inventors discovered that the roughly spherical shape of the particles of a powder according to the invention improves the resistance to thermal shock, independently of the open pore volume of the powder.

As explained above, the inventors also discovered that the open pore volume of the powder influences the flowability of the initial charge.

It is possible to grind the particles of a powder according to the invention so as to reduce their size and obtain matrix particles. It is important, however, for obtaining an improvement in resistance to thermal shock, to introduce unground particles according to the invention in the initial charge.

In step C), the sintering conditions, and in particular the sintering temperature, depend on the composition of the particulate mixture. Usually, a sintering temperature between 1400° C. and 1700° C., preferably between 1500° C. and 1600° C. is very suitable.

At the end of step C), a sintered refractory product according to the invention is obtained.

Figure 2:
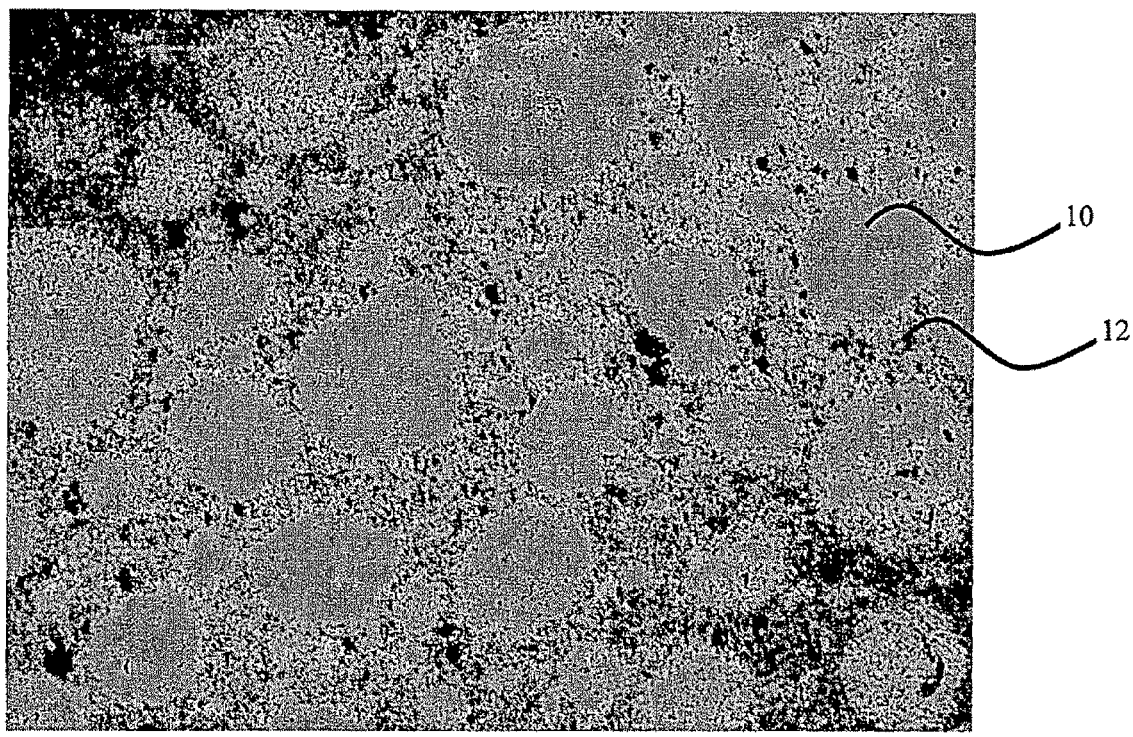
FIG. 2 shows a photograph of a section through a refractory product according to the invention.

Such a product is shown in FIG. 2. In particular, the particles according to the invention 10, roughly circular, and the matrix 12 are clearly discernible.

The sintered refractory product can have an apparent density above 3.00, above 3.10, above 3.30, above 3.50, and/or below 4.30, or below 4.20.

It can have an open pore volume greater than 10%, greater than 12%, greater than 14%, and/or less than 20%, less than 18%, or even less than 15%.

The properties of this product make it particularly suitable for use in a glass furnace, a regenerator, or a distributing channel for molten glass ("feeder").

A sintered product according to the invention can be used in the form of blocks or as a layer, for example in the form of a lining applied, by any known method, on a wall that is to be protected. The sintering can be carried out in situ, i.e. after the product has been placed in its working position.

EXAMPLES

The following examples are given for purposes of illustration and do not limit the invention.

The powders according to the invention in the examples were manufactured by the following method:

The following raw materials were used:
pigment-grade chromium oxide $Cr_2O_3$ of purity above 95%, having a specific surface equal to 4 m²/g and a median size of 0.7 gym;
alumina $Al_2O_3$ of purity above 99%, having a specific surface equal to 7 m²/g, and a median size of 0.6 μm;
fumed silica, of purity above 92%;
titanium dioxide, in the rutile form, of purity above 93% and having a median size of 1.5 μm.

These raw materials were dosed and mixed so as to provide the desired chemical composition.

For each example, 3000 g of mixture of oxides, 350 g of water and 150 g of polyvinyl alcohol (PVA) are put in an Eirich RV02 mixer.

The whole is then mixed for 1 minute, with a rotor tool rotating at 300 rev/min and a bowl set at 43 rev/min in order to obtain a homogeneous mixture. The rotary speed of the rotor tool is then increased to 1050 rev/min, and an additional amount of 900 grams of the mixture of oxides is then added gradually in one minute. Rotation is maintained for 2 minutes after addition of additional amount of charge. The particles are then discharged, dried in air for 24 h at 110° C. before being sintered at 1550° C. for a holding time at temperature of 3 hours, in air, with a rate of temperature increase and a rate of temperature decrease of 50° C./h. After sintering, the particles are sieved and the granulometric fraction 0.5-5 mm is kept.

The grains in the comparative examples were manufactured by extrusion of the same mixtures as those used for making the powders according to the invention, to obtain extruded cakes. These extruded cakes were then sintered in air in a thermal cycle having a plateau of 3 hours at 1550° C., and finally were ground and sieved to obtain the granulometric fraction 0.5-5 mm.

The results of the measurements are presented in Table 1 below, all the contents being in percentage by weight based on the oxides:

products in comparative examples 1*, 2* and 3*, the powders according to the invention were replaced with identical amounts of chamotte grains of the same granulometry and with the same chemical analysis, but not having a median circularity above 0.87. In the product in comparative example 4*, the following grains were used:

Grains "AZS-Cr" of the electrocast refractory product ER-2161 manufactured by Société Européenne des Produits Réfractaires, containing in percentage by weight based on the oxides: 27% of $Cr_2O_3$, 27% of $ZrO_2$, 28% of $Al_2O_3$, 14.5% of $SiO_2$ and 1.1% of $Na_2O$, with maximum size less than 5 mm;

Chamotte grains "high chrome" containing 98% of $Cr_2O_3$ and having an open pore volume below 3%, with maximum size less than 5 mm.

3% of a forming additive (alumina cement CA25 marketed by ALMATIS) was added to the initial charge.

For examples 1*, 2*, 3*, 1 to 6, the matrix fraction represented 37 wt % of the particulate mixture of oxides, and 35 wt % of the particulate mixture of oxides for example 4*; and contained chromium oxide of pigment-grade, alumina, zirconia and additive. The matrix fraction did not contain particles according to the invention (for the examples according to the invention), nor particles of chamotte or AZS-Cr grains (for the examples not according to the invention).

In step B), the initial charge was formed by a vibratory casting technique in the form of a preform with dimensions suitable for the measurement to be carried out.

In step C), the preform obtained was dried and then sintered in air at a temperature of 1550° C., for 10 hours.

The following measurements were performed:

The apparent density and open pore volume of a set of particles were measured by the following method:

Dry at 110° C. for at least 12 hours, 4 samples of 35 grams each consisting of particles whose size is between 2 and 5 mm. The dry weight of each of the samples is designated $Ps_1$, $Ps_2$, $Ps_3$ and $Ps_4$. Note that $Ps=Ps_1+Ps_2+Ps_3+Ps_4$.

TABLE 1

| | G1* Chamotte grains | G1 Powder according to the invention | G2* Chamotte grains | G2 Powder according to the invention | G3 Powder according to the invention | G4 Powder according to the invention |
|---|---|---|---|---|---|---|
| $Cr_2O_3$ | 44.2 | 43.6 | 87.3 | 87.3 | 57.2 | 57.5 |
| $Al_2O_3$ | 51.4 | 52.5 | 6.51 | 6.37 | 37.5 | 37.5 |
| $ZrO_2$ | 0.13 | 0.14 | 0.24 | 0.23 | 0.18 | 0.16 |
| $SiO_2$ | 1.67 | 1.57 | 3.73 | 3.78 | 2.35 | 2.38 |
| MgO | 0.07 | 0.06 | 0.03 | 0.04 | 0.05 | 0.06 |
| $Fe_2O_3$ | 0.06 | 0.05 | 0.08 | 0.07 | 0.05 | 0.05 |
| $TiO_2$ | 1.7 | 1.5 | 1.91 | 1.91 | 1.93 | 1.89 |
| Others | 0.77 | 0.58 | 0.2 | 0.3 | 0.74 | 0.46 |
| $Cr_2O_3 + Al_2O_3 + ZrO_2 + MgO + Fe_2O_3 + SiO_2 + TiO_2$ | 99.23 | 99.42 | 99.8 | 99.8 | 99.26 | 99.54 |
| $Cr_2O_3 + Al_2O_3 + MgO$ | 95.67 | 96.16 | 93.84 | 93.71 | 94.75 | 95.06 |
| Apparent density (g/cm³) | 4.16 | 4.03 | 4.6 | 4.65 | 4.28 | 4.28 |
| Open pore volume (%) | 0.6 | 0.6 | 0.5 | 0.6 | 1.0 | 0.9 |
| Median circularity $Ci_{50}$ | 0.823 | 0.916 | 0.850 | 0.939 | 0.896 | 0.929 |
| Circularity $Ci_{10}$ | 0.654 | 0.728 | 0.701 | 0.742 | 0.760 | 0.825 |
| Median convexity $Co_{50}$ | 0.949 | 0.965 | 0.945 | 0.972 | 0.954 | 0.967 |
| Convexity $Co_{10}$ | 0.830 | 0.837 | 0.841 | 0.850 | 0.875 | 0.909 |

*not of the invention

Sintered refractory products were manufactured according to steps A) to C) above.

In step A), the initial charge was prepared by mixing an amount of water between 4.1% and 4.7% with a particulate mixture adjusted for the desired chemical composition. In the Put each sample in a bottle.

Using a vacuum pump, create a vacuum of at least 0.07 MPa in each bottle and maintain this vacuum for 7 minutes. Then add water to the bottle so as to cover the particles with at least 2 cm of water, which means that the particles are always covered with water during subsequent vacuuming.

Create a vacuum of 0.08 MPa again in each bottle containing the particles and water, and maintain this vacuum for 7 minutes. Break the vacuum.

Create a vacuum of 0.08 MPa again in each bottle, and maintain this vacuum for 7 minutes. Break the vacuum.

Create a vacuum of 0.08 MPa again in each bottle, and maintain this vacuum for 7 minutes. Break the vacuum.

Determine the immersed weight of each sample, $Pi_1$, $Pi_2$, $Pi_3$ and $Pi_4$. Note that $Pi=Pi_1+Pi_2+Pi_3+Pi_4$.

Then pour the contents of the 4 bottles onto a 2 mm square mesh sieve to remove the water. Then pour the particles onto a dry cotton cloth in order to remove the excess water and dry the particles until the wetness luster has disappeared from their surface.

Determine the wet weight Ph of the set of particles.

The apparent density of the set of particles is equal to $Ps/(Ph-Pi)$.

The open pore volume of the set of particles is equal to $(Ph-Ps)/(Ph-Pi)$.

These measurements are always conducted on sets of sintered particles. They correspond to average measurements on the material constituting the particles, i.e. they do not take into account the interstices between the various particles.

The apparent density and open pore volume of a sintered product were measured on specimens of dimensions 125×25×25 mm$^3$, according to standard ISO 5017.

The circularities $Ci_{50}$ and $Ci_{10}$ and convexities $Co_{50}$ and $Co_{10}$ of a set of particles can be evaluated by the following method:

A sample of particles having sizes between 0.5 and 2 mm is poured onto the glass plate provided for this purpose of a Morphologi® G3 instrument marketed by the company Malvern. The magnification selected is 1×. The analysis is started. In order to avoid recording any scratches on the glass plate and dust, the measurements corresponding to particles having a width of less than 0.4 mm are eliminated from the count by creating a filter ("width<400"). The number of particles recorded after filtering is greater than 250.

The instrument provides an evaluation of the distribution of the circularities ("Circularity") and of the convexities ("Convexity"), the particles being counted by number.

It is also possible to estimate the distribution of the circularities and convexities of the particles present in a sintered product by analyzing images of a section of said product, as shown in FIG. 2.

The chemical analyses were performed by X-ray fluorescence for constituents whose content is above 0.5%. The content of constituents present at a content below 0.5% was determined by AES-ICP (Atomic Emission Spectroscopy-Inductively Coupled Plasma).

For measuring the average corrosion rate, samples in the form of cylindrical bars with an initial radius $r_o$ equal to 11 mm and a height of 100 mm were taken and were submitted to a test consisting of rotating the samples immersed in a bath of molten glass C, heated to a temperature T of 1450° C. The speed of rotation of the samples was 6 revolutions per minute. The samples were kept immersed for a time Δt of 120 hours. At the end of this time and after cooling, the portion of a sample that was immersed in the glass (with height H equal to 30 mm) has a cross section in the form of an ellipse with minor axis Pa and major axis Ga. The following are determined for each sample: minimum value of Pa (Pam) in mm, maximum value of Pa (PaM) in mm, minimum value of Ga (Gam) in mm and maximum value of Ga (GaM) in mm. The following are fixed: $Pa_{ave}=(Pam+PaM)/2$ and $Ga_{ave}(Gam+GaM)/2$. For each sample the average volume remaining $Vr_{ave}$ is determined from the formula $Vr_{ave}=(\pi \cdot H \cdot Pa_{ave} \cdot Ga_{ave})/4$. For each sample, the average volume corroded $Vc_{ave}$ is then determined from the formula $Vc_{ave}=[(\pi \cdot H \cdot 22)/4]-Vr_{ave}$.

The average corrosion rate "Vu" of a sample is determined from the formula $$Vu = \frac{r_0 - \sqrt{r_0^2 - \left(\frac{Vc_{ave}}{\pi H}\right)}}{\Delta t}.$$

This rate gives an evaluation of the corrosion resistance of the sample tested. Thus, the lower the corrosion rate of a sample, the higher its resistance to corrosion by molten glass.

The roughness index Ir of sample i, $Ir_i$, is determined from the following formula:

$Ir_i=[100 \cdot (Vc_{ave} \text{ reference sample})/(Vc_{ave} \text{ reference sample}-\Delta V \text{ sample } i)]-100$, in which $\Delta V=(Vc_{ave}-VcM)$.

The standardized test PRE III,26/PRE/R,5,1/78 was used for evaluating the resistance to thermal shock by measuring the relative loss of bending strength (% Loss MOR) after one or more thermal cycles. Each thermal cycle consists of heating the test specimen from room temperature to a temperature T of 800° C., holding it at this temperature T for 30 minutes, then plunging it into cold water. The test specimens are bars of 125×25×25 mm$^3$ that do not have a skin face.

The bending strength was measured according to standard ISO 5014. For a given composition, the measurement of initial bending strength of the test specimens (not yet submitted to thermal shock), or "MOR initial", is the average value measured on 3 identical test specimens. The measurement of resistance after thermal shock at 800° C., or "MOR after TS", is the average value of bending strength measured at room temperature on 3 test specimens after they have been submitted to said thermal shock. The measurement of the relative loss of bending strength, or "% Loss MOR", is given by the following formula:

% Loss $MOR=100 \cdot (MOR \text{ after } TS-MOR \text{ initial})/(MOR \text{ initial})$ Samples 1*, 2*, 3* and 4* are the reference samples of samples 1, 2, 3 and 6, respectively. Sample 3* constitutes the reference sample of samples 4 and 5.

Tables 2 and 3 present the particulate mixtures produced and the results obtained.

TABLE 2

|  | 1* | 1 | 2* | 2 | 3* | 3 | 4 | 5 |
|---|---|---|---|---|---|---|---|---|
| Granulates | | | | | | | | |
| Chamotte grains G1*, 0.5-5 mm | 35 | — | 35 | | | | | |
| Particles according to the invention G1, 0.5-5 mm | — | 35 | — | 35 | | | | |

TABLE 2-continued

|  | 1* | 1 | 2* | 2 | 3* | 3 | 4 | 5 |
|---|---|---|---|---|---|---|---|---|
| Chamotte grains G2*, 0.5-5 mm | — | — | 8.5 | — | — | — | — | — |
| Particles according to the invention G2*, 0.5-5 mm | — | — | — | 8.5 | — | 47 | — | — |
| Particles according to the invention G3, 0.5-5 mm | — | — | — | — | — | — | 47.5 | — |
| Particles according to the invention G4, 0.5-5 mm | — | — | — | — | — | — | — | 47.5 |
| Product obtained after forming and sintering the particulate mixture (percentages by weight) | | | | | | | | |
| $Cr_2O_3$ | 63.9 | 63.5 | 62.3 | 61.8 | 86.1 | 80.5 | 61.6 | 62.0 |
| $Al_2O_3$ | 28.0 | 28.6 | 30.4 | 30.9 | 2.48 | 7.76 | 30.8 | 30.2 |
| $ZrO_2$ | 4.86 | 4.70 | 4.5 | 4.32 | 7.92 | 7.81 | 4.22 | 4.43 |
| $SiO_2$ | 1.32 | 1.34 | 1.15 | 1.18 | 1.02 | 1.23 | 1.23 | 1.31 |
| MgO | 0.04 | 0.05 | 0.04 | 0.05 | 0.05 | 0.05 | 0.05 | 0.05 |
| $Fe_2O_3$ | 0.12 | 0.13 | 0.09 | 0.13 | 0.09 | 0.14 | 0.18 | 0.15 |
| $TiO_2$ | 1.27 | 1.25 | 1.1 | 1.27 | 1.97 | 2.08 | 1.34 | 1.38 |
| Others | 0.49 | 0.43 | 0.42 | 0.35 | 0.37 | 0.43 | 0.58 | 0.48 |
| $Cr_2O_3 + Al_2O_3 + ZrO_2 + MgO + Fe_2O_3 + SiO_2 + TiO_2$ | 99.51 | 99.57 | 99.58 | 99.65 | 99.63 | 99.57 | 99.42 | 99.52 |
| $Cr_2O_3 + Al_2O_3$ | 91.9 | 92.1 | 92.7 | 92.7 | 88.58 | 88.26 | 92.40 | 92.20 |
| Apparent density of the sintered product (g/cm³) | 3.75 | 3.83 | 3.77 | 3.80 | 4.00 | 4.10 | 3.79 | 3.81 |
| Open pore volume of the sintered product (%) | 17.2 | 16.4 | 16.9 | 15.3 | 18.0 | 14.7 | 16.2 | 15.5 |
| % Loss MOR before/after thermal shock at 800° C. (%) | 58 | 45 | 71 | 60 | 70 | 60 | 46 | 35 |
| Average corrosion rate Vu, in µm/h - test 1 | 8.4 | 7.2 | 8.4 | 6 | — | — | 7.1 | 6 |
| Average corrosion rate Vu, in µm/h - test 2 | — | — | — | — | 7.6 | 7.2 | — | — |

TABLE 3

| Example | 4* | 6 |
|---|---|---|
| Particulate mixture | | |
| % $Cr_T$ | 61.8 | 62 |
| Matrix    Composition | $Cr_2O_3$ $Al_2O_3$ Cement — | $Cr_2O_3$ $Al_2O_3$ Cement $ZrO_2$ |
| Quantity of matrix (%) | 35 | 37 |
| % $Cr_M$ | 67 | 68.8 |
| Conditions met | (I), (V) and (VI) | (I), (V) and (VI) |
| Median diameter (µm) | 1.9 | 2.2 |
| Grains    Quantity of grains | 65 | 63 |
| Composition | AZS-Cr high chrome | Particles according to the invention G3, 0.5-5 mm |
| % $Cr_G$ | 27 | 98 | 58 |
| Conditions met | (II) | (II), (III), (IV), (VII) and (VIII) |
| % of grains meeting said conditions | (II): 100% | (II): 100% (III): 100% (IV): 0% (VII): 100% (VIII): 100% |
| Median diameter (mm) | 1.6 | 2 |
| Sintered article obtained after sintering the participate mixture | | |
| % $Cr_2O_3$ | 61.8 | 62 |
| % $Al_2O_3$ | 16.5 | 29.6 |
| % $ZrO_2$ | 11.8 | 4.43 |
| % $SiO_2$ | 7.1 | 1.28 |
| % $TiO_2$ | 0.70 | 1.38 |
| % CaO | 0.90 | 0.93 |
| % Other elements | 1.2 | 0.38 |
| Apparent density (g/cm³) | 3.65 | 3.81 |
| Open pore volume (%) | 14.5 | 15.5 |
| % Loss MOR before/after thermal shock at 800° C. (%) | 65 | 48 |
| Average corrosion rate Vu, in µm/h - test 3 | 8.4 | 6 |
| Roughness index Ir - test 3 | 20 | 3 |

Comparison of comparative example 1* and example 1, comparative example 2* and example 2, comparative example 3* and example 3, comparative example 4* and example 6 shows the positive effect of introduction of particles according to the invention on the resistance to thermal shock.

The inventors also demonstrated a remarkable improvement in resistance to corrosion by molten glass for the products of examples 1, 2, 3 and 6.

The inventors also discovered the influence of the circularity of the powders according to the invention on the resistance to thermal shock, illustrated by the products according to the invention of examples 4 and 5: example 5, produced from powders according to the invention having a high median circularity (0.909), shows a smaller Loss MOR before/after thermal shock at 800° C. than that of example 4, produced from powders according to the invention having a lower circularity (0.875).

The inventors finally demonstrated an improvement in roughness index for the product according to example 6, a roughness index below 15 being representative of regular and uniform wear.

Comparison of the products of examples 4* and 6 shows that for similar total contents of chromium oxide, the product according to example 6 has, after corrosion testing, a roughness index more than six times less than that of example 4* as well as remarkable corrosion resistance.

As is now clear, the invention provides a solution for making sintered refractory products having good resistance to thermal shock and high corrosion resistance.

The invention claimed is:

1. A powder of particles, said powder having a median circularity above 0.87 and at least 90 wt % of particles larger than 100 µm, the powder and at least 80 wt % of the particles having a chemical composition in percentage by weight based on oxides and for a total of 100%, comprising:
   $Cr_2O_3+Al_2O_3+ZrO_2+MgO+Fe_2O_3+SiO_2+TiO_2 \geq 90\%$,
   $Cr_2O_3+Al_2O_3+MgO \geq 60\%$,
   $Cr_2O_3 \geq 9\%$,
   $20\% \geq SiO_2 \geq 0.5\%$, and
   other oxides: $\leq 10\%$.

2. The powder as claimed in claim 1, wherein $Cr_2O_3+Al_2O_3+ZrO_2+MgO+Fe_2O_3+SiO_2+TiO_2 \geq 95\%$.

3. The powder as claimed in claim 1, wherein $Cr_2O_3+Al_2O_3+MgO > 65\%$, in percentage by weight based on the oxides.

4. The powder as claimed in claim 1, wherein $SiO_2 < 8\%$.

5. The powder as claimed in claim 1, wherein $4\% > TiO_2 > 0.5\%$.

6. The powder as claimed in claim 1, having at least 90 wt % of particles larger than 400 μm.

7. The powder as claimed in claim 1, wherein
the particles are sintered.

8. The powder as claimed in claim 1, having an apparent density greater than 85% of the theoretical density.

9. The powder as claimed in claim 1, having an apparent density above 3.0 g/cm³.

10. The powder as claimed in claim 1, having a median circularity above 0.88 and/or a median convexity above 0.90.

11. The powder as claimed in claim 1, having an open pore volume below 2% and a median circularity above 0.90.

12. The powder as claimed in claim 1, having a chemical composition in percentage by weight based on the oxides and for a total of 100%, comprising:
$Cr_2O_3$: 9% to 50%;
$Al_2O_3$: 45% to 88%;
$0.5\% \leq SiO_2 < 20\%$;
$Fe_2O_3 < 1\%$;
$MgO < 0.5\%$;
$0.5\% < TiO_2 < 4\%$;
$ZrO_2 < 5\%$; and
other oxides < 2%.

13. The powder as claimed in claim 1, obtained by a method having a granulation step.

14. A particulate mixture having, in percentage based on the particulate mixture,
more than 10% of particles with a size less than or equal to 50 μm, and
more than 15% of a powder as claimed in claim 1.

15. The particulate mixture as claimed in claim 14, said powder representing more than 20% of said particulate mixture, in percentage by weight based on the particulate mixture.

16. The particulate mixture as claimed in claim 14, wherein said powder constitutes at least 80 wt % of particles larger than 100 μm.

17. The particulate mixture as claimed in claim 14, having a chemical composition in percentage by weight based on the oxides, wherein the powder comprises:
$Cr_2O_3 + Al_2O_3 > 80\%$;
$10\% < Cr_2O_3 < 50\%$;
$0.5\% \leq SiO_2 < 20\%$;
$Fe_2O_3 < 1\%$;
$MgO < 0.5\%$;
$0.5\% < TiO_2 < 4\%$;
$ZrO_2 < 5\%$; and
other oxides < 2%.

18. The particulate mixture as claimed in claim 14, having a content of chromium oxide, designated "$Cr_T$", between 10% and 82%, in percentage by weight based on the oxides of the refractory mixture,
the matrix fraction being $$0.39 \cdot (Cr_T) + 24 < Cr_M < 0.39 \cdot (Cr_T) + 52 \quad (I),$$

$Cr_M$ denoting the content by weight of chromium oxide in the matrix fraction, in percentage by weight based on the oxides of the matrix fraction, and
the granulate being $x_{II} \geq 97\%$, $x_{III} \geq 70\%$, and $x_{IV} \leq x_{III} - 70\%$,
$Cr_G$ denoting the content by weight of chromium oxide in a grain, in percentage by weight based on the oxides of said grain,
$x_{II}$ denoting the quantity, in percentage by weight based on the granulate, of grains fulfilling the following condition (II):

if $10\% \leq Cr_T \leq 30\%$, then $Cr_G \leq 0.018 \cdot (Cr_T)^2 - 0.390 \cdot (Cr_T) + 58.8$;

if $30\% < Cr_T \leq 60\%$, then $Cr_G \leq 1.22 \cdot (Cr_T) + 26.7$;

if $60\% < Cr_T \leq 82\%$, then $Cr_G \leq 100$, \quad (II)

$x_{III}$ denoting the quantity, in percentage by weight based on the granulate, of grains fulfilling the following condition (III):

if $10\% \leq Cr_T \leq 30\%$, then $0.018 \cdot (Cr_T)^2 - 0.390 \cdot (Cr_T) + 9.10 \leq Cr_G \leq 0.018 \cdot (Cr_T)^2 - 0.390 \cdot (Cr_T) + 25.10$;

if $30\% < Cr_T \leq 60\%$, then $1.17 \cdot (Cr_T) - 21.5 \leq Cr_G \leq 1.17 \cdot (Cr_T) - 5.5$;

if $60\% < Cr_T \leq 82\%$, then $1.17 \cdot (Cr_T) - 21.5 \leq 1.67 \cdot (Cr_T) - 35.5$, and $x_{IV}$ denoting the quantity, in percentage by weight based on the granulate, of grains fulfilling the following condition (IV):

If $10\% \leq Cr_T \leq 30\%$, then $0.018 \cdot (Cr_T)^2 - 0.390 \cdot (Cr_T) + 9.10 > Cr_G$;

If $30\% < Cr_T \leq 60\%$, then $1.17 \cdot (Cr_T) - 21.5 > Cr_G$;

If $60\% < Cr_T \leq 82\%$, then $1.17 \cdot (Cr_T) - 21.5 > Cr_G$. \quad (IV)

19. The particulate mixture as claimed in claim 18, wherein $x_{II} \geq 99\%$.

20. The particulate mixture as claimed in claim 18, wherein $$0.39 \cdot (Cr_T) + 29 < Cr_M < 0.39 \cdot (Cr_T) + 47. \quad (V)$$

21. The particulate mixture as claimed in claim 20, wherein $$0.39 \cdot (Cr_T) + 32 < Cr_M < 0.39 \cdot (Cr_T) + 44.5. \quad (VI)$$

22. The particulate mixture as claimed in claim 21, wherein at least 70 wt % of the grains have, in percentage by weight based on the oxides, a content of chromium oxide fulfilling the following condition (VII):

If $10\% \leq Cr_T \leq 30\%$, then $0.018 \cdot (Cr_T)^2 - 0.390 \cdot (Cr_T) + 13.10 \leq Cr_G \leq 0.018 \cdot (Cr_T)^2 - 0.390 \cdot (Cr_T) + 21.10$;

If $30\% < Cr_T \leq 60\%$, then $1.17 \cdot (Cr_T) - 17.5 \leq Cr_G \leq 1.17 \cdot (Cr_T) - 9.5$;

If $60\% < Cr_T \leq 82\%$, then $1.67 \cdot (Cr_T) - 51.5 \leq Cr_G \leq 1.67 \cdot (Cr_T) - 39.5$.

23. The particulate mixture as claimed in claim 22, wherein if $60\% \leq Cr_T \leq 82\%$, then $1.67 \cdot (Cr_T) - 47.5 \leq Cr_G$.

24. The particulate mixture as claimed in claim 18, wherein at least 90 wt % of the grains have a content of chromium oxide "$Cr_G$" fulfilling condition (III)

if $10\% \leq Cr_T \leq 30\%$, then $0.018 \cdot (Cr_T)^2 - 0.390 \cdot (Cr_T) + 9.10 \leq Cr_G \leq 0.018 \cdot (Cr_T)^2 - 0.390 \cdot (Cr_T) + 25.10$;

if $30\% < Cr_T \leq 60\%$, then $1.17 \cdot (Cr_T) - 21.5 \leq Cr_G \leq 1.17 \cdot (Cr_T) - 5.5$;

if $60\% < Cr_T \leq 82\%$, then $1.17 \cdot (Cr_T) - 21.5 \leq 1.67 \cdot (Cr_T) - 35.5$ and/or condition (VII)

If $10\% \leq Cr_T \leq 30\%$, then $$0.018 \cdot (Cr_T)^2 - 0.390 \cdot (Cr_T) + 13.10 \leq Cr_G \leq 0.018 \cdot (Cr_T)^2 - 0.390 \cdot (Cr_T) + 21.10;$$

If $30\% < Cr_T \leq 60\%$, then $1.17 \cdot (Cr_T) - 17.5 \leq Cr_G \leq 1.17 \cdot (Cr_T) - 9.5$;

If $60\% < Cr_T \leq 82\%$, then $1.67 \cdot (Cr_T) - 51.5 \leq Cr_G \leq 1.67 \cdot (Cr_T) - 39.5$.

25. The particulate mixture as claimed in claim 18, having a content of chromium oxide, designated "$Cr_T$", less than or equal to 80%, in percentage by weight based on the oxides of the refractory mixture.

26. The particulate mixture as claimed in claim 13, having more than 0.1% of a forming additive.

27. A sintered product obtained by sintering a particulate mixture as claimed in claim 14.

28. A device selected from a reactor, in particular a gasifier reactor, a glass furnace, a regenerator, and a glass distributing channel, said device comprising a block and/or a lining of a sintered product as claimed in claim 27.

29. The device as claimed in claim 28, selected from a glass furnace and a glass distributing channel.

30. The powder as claimed in claim 1, having a chemical composition in percentage by weight based on the oxides and for a total of 100%, comprising:
  $Cr_2O_3$: 50% to 95%;
  $Al_2O_3$: 2% to 45%;
  $0.5\% \leq SiO_2 < 20\%$;
  $Fe_2O_3 < 1\%$;
  $MgO < 0.5\%$;
  $0.5\% < TiO_2 < 4\%$;
  $ZrO_2 < 5\%$; and
  other oxides < 2%.

31. The powder as claimed in claim 1, having a chemical composition in percentage by weight based on the oxides and for a total of 100%, comprising:
  $Cr_2O_3$: 95% to 99%;
  $Al_2O_3$: 0 to 4%;
  $0.5\% \leq SiO_2 < 4\%$;
  $Fe_2O_3 < 4\%$;
  $MgO < 0.5\%$;
  $0.5\% < TiO_2 < 5\%$;
  $ZrO_2 < 5\%$; and
  other oxides < 2%.

32. The powder as claimed in claim 1, having a chemical composition in percentage by weight based on the oxides and for a total of 100%, comprising:
  $Cr_2O_3$: 15% to 50%;
  $Al_2O_3$: 10% to 80%;
  $1\% < Fe_2O_3 < 30\%$;
  $0.5\% < MgO < 20\%$;
  $0.5\% \leq SiO_2 < 20\%$;
  $0.5\% < TiO_2 < 4\%$;
  $ZrO_2 < 5\%$; and
  other oxides < 2%.

33. The particulate mixture as claimed in claim 14, having a chemical composition in percentage by weight based on the oxides, wherein
  the powder comprises:
  $Cr_2O_3 + Al_2O_3 > 80\%$;
  $50\% < Cr_2O_3 < 83\%$;
  $0.5\% \leq SiO_2 < 20\%$;
  $Fe_2O_3 < 1\%$;
  $MgO < 0.5\%$;
  $0.5\% < TiO_2 < 4\%$;
  $ZrO_2 < 5\%$; and
  other oxides < 2%.

34. The particulate mixture as claimed in claim 14, having a chemical composition in percentage by weight based on the oxides, wherein
  the powder comprises:
  $80\% < Cr_2O_3$;
  $0.5\% \leq SiO_2 < 4\%$;
  $Fe_2O_3 < 1\%$;
  $MgO < 0.5\%$;
  $0.5\% < TiO_2 < 4\%$;
  $ZrO_2 < 5\%$; and
  other oxides < 2%.

35. The particulate mixture as claimed in claim 14, having a chemical composition in percentage by weight based on the oxides, wherein
  the powder comprises:
  $Cr_2O_3 + Al_2O_3 > 55\%$;
  $9\% \leq Cr_2O_3 < 50\%$;
  $0.5\% \leq SiO_2 < 20\%$;
  $1\% < Fe_2O_3 < 30\%$;
  $MgO < 20\%$;
  $0.5\% < TiO_2 < 4\%$;
  $ZrO_2 < 5\%$; and
  other oxides < 2%.

\* \* \* \* \*